Nov. 7, 1933.                R. DEUSER ET AL                1,934,526
ALTERNATING CURRENT RELAY
Filed Jan. 14, 1932
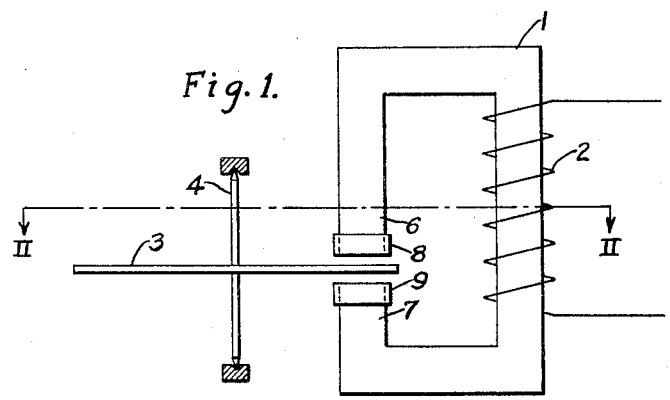
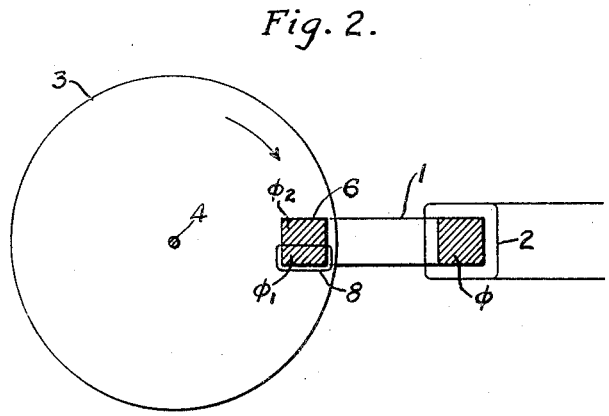
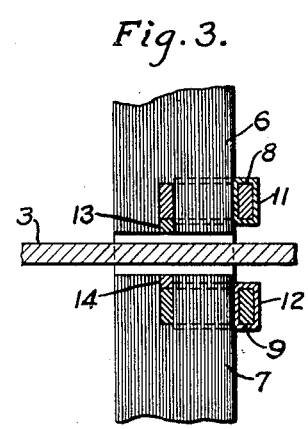
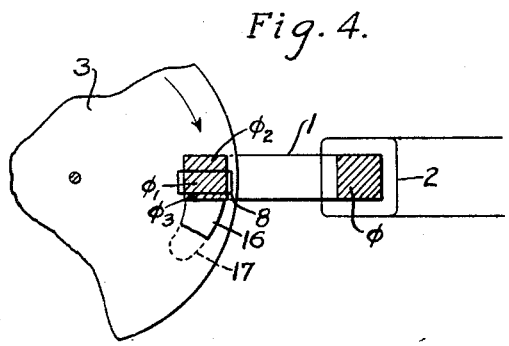
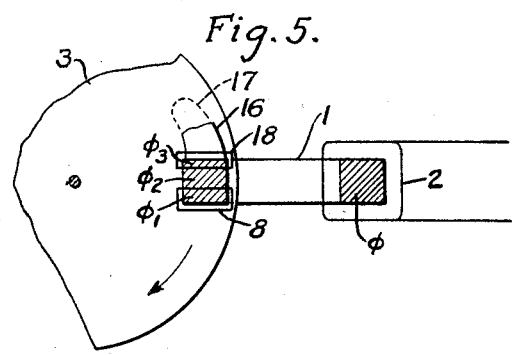
WITNESSES:
INVENTOR
Robert Deuser
Adolf Thewalt
BY
ATTORNEY Patented Nov. 7, 1933

1,934,526

UNITED STATES PATENT OFFICE 1,934,526

ALTERNATING CURRENT RELAY

Robert Deuser and Adolf Thewalt, Berlin-Siemensstadt, Germany, assignors to Westinghouse Electric and Manufacturing Company, a corporation of Pennsylvania Application January 14, 1932, Serial No. 586,554, and in Germany January 15, 1931

9 Claims. (Cl. 175—320)

The present invention is directed to induction type relays and contemplates means for obtaining any desired speed characteristic which is made dependent on the energizing current for such relay. The relay of the present invention does not require or include mechanical or electro-magnetic braking means of the well known types, and the limitations which attend the use of such prior braking means are avoided.

The known types of braking devices include mechanical brakes and eddy-current brakes. The use of mechanical brakes is very limited in view of the fact that this type of brake requires at least some supervision and, therefore, relays embodying them must be installed where supervision is possible.

In relays employing eddy-current brakes, wherein a permanent magnet exerts the braking torque, the relay may be used in places where the permanent magnet is exposed to strong pulsating magnet fluxes with the result that such magnet becomes demagnetized and the braking action thereof is altered. Obviously, therefore, in such relay applications, the setting of the relay is altered materially, resulting in inaccuracies in relaying certain kinds of faults and abnormal conditions existing on the system or apparatus which is to be protected.

It is also apparent that the speed of the relay is dependent on the characteristic of the braking means and may not be made a function of the energizing current of the relay. In many applications it is necessary and desirable to provide a relay having a speed of operation which is a function of the energizing current for the relay, and it is obvious to one skilled in the art that all prior relays provided with either a mechanical or an eddy-current brake are improperly designed to produce such speed characteristic.

It is an object of the present invention, therefore, to provide a relay having an operating-speed characteristic which is a function of the energizing current for the relay.

Another object of the invention is to eliminate the necessity for a mechanical braking means in an induction type relay.

Another object of the invention is to provide an induction type relay which is designed in such manner that the speed characteristic thereof is not affected by external influences, such as pulsating magnetic fluxes.

A further object of the invention is to obtain any desired speed characteristic in an induction relay by effecting a proper choice of the degree of saturation of the magnetic system of such relay.

A further object of the invention is to control the saturation of the magnetic system of an induction type relay in such a manner that the speed of operation is made a function of the energizing current of the relay energizing winding.

Further objects and advantages of the present invention will readily become apparent from the following detailed description of the several figures of the drawing wherein:

Figure 1 is a schematic illustration of an induction type relay as contemplated in one modification of the present invention, Fig. 2 is a view, in section, taken on the line II—II of Fig. 1, Fig. 3 is a view, in section, of the pole member arrangement of one modification of the invention.

Fig. 4 is a view corresponding to Fig. 2 illustrating a modification of the present invention, and Fig. 5 is a view corresponding to Figs. 2 and 4 and illustrating a further modification of the present invention.

Referring to Figs. 1 and 2 in the drawing, an induction type relay is shown schematically as including a core 1 provided with an energizing winding 2 and a disc armature 3 mounted on a spindle or shaft 4 and disposed for rotation between vertically alined pole members 6 and 7 of the core 1. A shading coil or short-circuited turn 8 is associated with the pole member 6 on the upper side of the disc 3 and a second shading coil or short-circuited turn 9 is associated with the pole member 7 on the opposite side of the disc.

Referring more particularly to Fig. 2, in conjunction with Fig. 1, it may be noted that the shading coils 8 and 9 are so positioned with respect to the pole members 6 and 7, respectively, that the main flux of the core 1 is split by the short circuited turns into two flux components. Assuming the flux produced by the core 1 to be represented by $\phi$, the short circuited turns 8 and 9 produce resulting fluxes $\phi_1$ and $\phi_2$. The flux $\phi_1$ is assumed to be passing through the area of the pole members surrounded by the short circuited turns 8 and 9, while the flux $\phi_2$ is assumed to be passing through the remaining area of the pole members.

The two fluxes $\phi_1$ and $\phi_2$ have a certain phase displacement with respect to each other and act to produce alternating current fluxes in the disc armature 3 which function to exert a torque on the disc in a direction to rotate the armature in the direction indicated by the arrow.

Since no braking force is effective to limit the speed of rotation of the disc 3, the disc will rotate at a constant speed independent of the energizing current in the armature winding 2. This constant speed is determined by the synchronous speed of the relay.

In order to obtain a desired relation between the speed of rotation of the disc and the energizing current in the winding 2, suitable saturating means is provided in connection with the short circuited turns or shading coils 8 and 9 in such manner that the magnitude of the flux $\phi_1$ cooperating with the disc member 3 is altered in accordance with the degree of saturation of such saturating means.

With more particular reference to Fig. 3 of the drawing, the short-circuited turns 8 and 9 are illustrated as surrounding a portion of the pole members 6 and 7, respectively. Suitable ferro-magnetic shells 11 and 12 are adapted to at least partially surround the short-circuited turns 8 and 9, respectively, and the thickness of such shells may be predetermined in accordance with the saturating characteristics which it is desired to attain.

The provision of the ferro-magnetic material surrounding the short-circuited turns 8 and 9 results in part of the counter-flux set up by the current in each of the short-circuited turns being shunted through the circuit provided by such ferro-magnetic material or shells 11 and 12, respectively, and such shunted flux does not cooperate with the flux $\phi_2$ to contribute to the torque exerted on the disc armature.

In other words, the ferro-magnetic shells provide a magnetic shunt for the counter-flux caused by the short-circuited turns, and the degree of saturation of the shells determines the resultant short-circuited-turn flux which is effective to cooperate with the disc armature to provide the rotating torque.

The saturation of the shells 11 and 12 is determined by the thickness of the ferro-magnetic material comprising the shells, and it is obvious that for increased energizations of the winding 2, the magnetic shunt provided by the shells becomes more and more inactive with a resulting increasing torque on the disc armature 3.

It is apparent, therefore, that the speed of rotation of the disc armature is made a function of the energizing current of the winding 2 and such speed is obtained without the use of mechanical or magnetic braking means.

The provision of the ferro-magnetic shells 11 and 12 results in shunting a part of flux $\phi_1$ which is caused by the short circuited turns 8 and 9, respectively. As explained with reference to Fig. 2 of the drawing, the provision of the short-circuited turns 8 and 9 provide resulting phase-displaced fluxes $\phi_1$ and $\phi_2$ which cooperate to produce a torque acting on the disc armature 3. The shells 11 and 12 act to shunt part of the flux $\phi_1$ with the result that only a portion of such flux is permitted to cooperate with the disc armature 3, the amount thereof being determined by the degree of saturation of the ferro-magnetic material surrounding the short-circuited turns 8 and 9. As referred to hereinbefore, the saturating characteristics of the shells 11 and 12 may be predetermined by varying the thickness thereof.

The same general results may be obtained by making the slots in the pole members 6 and 7 deeper than required by the short-circuited turns 8 and 9, respectively, and closing the remainder of the slots by wedges 13 and 14 of ferro-magnetic material. The wedges effect a shunting of a part of flux provided by the short-circuited turns 8 and 9, and the amount of flux permitted to cooperate with the disc armature 3 is determined by the degree of thickness of such wedges. Obviously the size of the wedges may be predetermined to effect a desired speed of rotation of the disc, thereby resulting in an armature speed which is a function of the energizing current in the winding 2.

As shown in Fig. 3 of the drawing, both the magnetic shells 11 and 12 and the wedges 13 and 14 may be employed in the same relay, if desired.

Referring to Fig. 4 of the drawing, it may be noted that the short-circuited turns as illustrated by 8, are so associated with the pole members of the core 1 that a large and a small cross-sectional area of the pole members are provided outside of the area surrounded by the short-circuited turns. Pole shoes 16 and 17, or other suitable means for reducing the reluctance of the air gap between the small areas of the pole members, may be provided.

The disc 3 is adapted to rotate in the direction indicated by the arrow under the influence of a torque set up by the component flux $\phi_2$ passing through the large pole area outside of the short-circuited turn 8 and the flux $\phi_1$ passing through the part of the pole member surrounded by the short circuited turn 8. This torque is opposed by another torque set up by the component fluxes $\phi_2$ and a component flux $\phi_3$ passing through the small core area on the other side of the short circuited turn 8. The difference between these two torques increases with increasing energizing current in the winding 2, depending upon the higher inductions in the core member 1, until the saturation of the small core member outside of the short circuited ring 8 becomes more and more pronounced.

As a result of the increasing saturation of the small pole member areas, the speed of rotation of the disc will increase with the increased difference between the two torques acting upon the disc armature 3 with the result that the speed of rotation of the armature member becomes a function of the energizing current of the winding 2.

The pole shoes 16 and 17 are provided for the purpose of reducing the reluctance of the air gap between the small pole areas on the outside of the short-circuited turn 8 with the result that this part of the magnet system will become saturated more rapidly than the remaining parts.

Referring to Fig. 5 of the drawing, the same general effect may be obtained by providing a second set of short-circuited turns or shading coils. In this modification, the short-circuited turn 8 is associated with the pole members of the core 1, in a similar manner to the arrangement shown in Fig. 2 of the drawing. A second set of short-circuited turns or shading coils 18 are associated with a small portion of the pole areas, as indicated in the drawing, and suitable pole shoes 16 and 17 are associated with the small pole areas in order to decrease the reluctance of the air gap between them. The provision of the short-circuited turns 8 and 18 results in the flux $\phi$ of the core member 1 being split up into the flux components $\phi_1$, $\phi_2$ and $\phi_3$. The flux $\phi_1$ passes through the pole area surrounded by the short-circuited turn 8, the flux $\phi_2$ passes through the pole area outside of the short-circuited turn 8, and the flux $\phi_3$ passes through the small pole area surrounded by the short-circuited turn 18. The respective fluxes $\phi_1$, $\phi_2$ and $\phi_3$ cooperate to effect rotating torques on the disc 3 with the result that the disc member is adapted to rotate in the direction indicated by the arrow. Pole shoes 16 and 17 are provided for the purpose of decreasing the reluctance of the air gap between the pole areas surrounded by the short-circuited turn 18, and the saturation thereof predetermines the relation between the speed of rotation of the disc and the degree of energization of the winding 2.

From the foregoing modifications of the present invention it may be observed that several alternative means have been disclosed whereby the speed of an induction type relay is made a function of the energizing current of the relay. Such speed characteristic may be varied in accordance with the type of saturating means employed or by providing a smaller air gap between small cross-sectional areas of the pole members of the main magnet system.

In view of the many possible varied forms of the present invention, no restrictions should be placed on the spirit and scope thereof other than as required by the prior art and as indicated in the appended claims.

We claim as our invention:

1. In a relay of the induction type, an induction disc, an electrically closed shading coil, a magnetic structure in cooperative relationship with said disc and said coil, said magnetic structure having a divided magnetic circuit including a path interlinked with said coil and passing through said disc, a path external to said coil and passing through said disc at a position angularly displaced from said first-mentioned path, and a magnetically closed path of restricted section interlinked with said coil externally to said disc, and energizing winding means inductively associated with a portion of said magnetic structure common to said two first-mentioned paths.

2. In a relay of the induction type, an induction disc, a magnetic core formed to provide a magnetic circuit passing through said disc, said core having a pair of pole members included in said magnetic circuit adjacent said disc, one of said pole members being divided to form three sections angularly displaced with reference to said disc, an end one of said sections being of restricted cross-sectional area as compared with the remaining end one of said sections and with the intermediate one of said sections, electrically closed shading coil means inductively associated with said divided pole member for producing a phase displacement between the flux in said intermediate section and the fluxes in said end sections, and energizing coil means inductively associated with said core at a position to interlink said magnetic circuit.

3. In an induction type relay, the combination including an electromagnet having an energizing winding, an armature member, short-circuited turns associated with said electromagnet and enclosing shells of a ferro-magnetic material associated with said short-circuited turns, the thickness of said enclosing shells being so chosen that the saturation thereof, for increasing energizing current in said energizing winding, effects a resulting speed of rotation of said armature member which is a function of the energizing current in said energizing winding.

4. In an induction type relay the combination including a core member having pole members, an energizing winding associated with said core member, an armature member disposed for rotation between the pole members of said core member, short-circuited turns associated with said pole members in such manner that a large and a small area of the cross-section of each pole member, outside of the area surrounded by the short-circuited turns, is provided, and means associated with said small-section areas of said pole members for reducing the reluctance of the air gap therebetween.

5. In an induction type relay the combination including a core member having aligned pole members, an energizing winding associated with said core member, an armature member disposed for rotation between the pole members of said core member, short-circuited turns associated with each of said pole members, additional short-circuited turns associated with small cross-sectional areas of each of said pole members, and means associated with each of said pole members for reducing the reluctance of the air gap between said small cross-sectional areas of said pole members.

6. In an induction type relay the combination including a core member having pole members, an energizing winding associated with said core member, an armature member disposed for rotation between the pole members of said core member, short-circuited turns associated with said pole members in such manner that a large and a small area of the cross-section of each pole member is provided outside of the area surrounded by the short-circuited turns, and means including pole shoes associated with said small cross-section areas of said pole members for reducing the reluctance of the air gap between said small cross-section areas of said pole members.

7. In an induction type relay the combination including a core member having aligned pole members, an energizing winding associated with said core member, an armature member disposed for rotation between the pole members of said core member, short-circuited turns associated with each of said pole members, additional short-circuited turns associated with small cross-sectional areas of each of said pole members, and means associated with each of said pole members including pole shoes associated with said small cross-sectional areas of said pole members for reducing the reluctance of the air gap between said small cross-section areas of said pole members.

8. In an induction type relay the combination including a core member having pole members, an energizing winding associated with said core member, an armature member disposed for rotation between the pole members of said core member, short-circuited turns associated with said pole members in such manner that a large and a small area of the cross-section of each pole member, outside of the area surrounded by the short-circuited turns, is provided, and means associated with said small cross-section areas of said pole members for decreasing the length of the air gap between said small areas and thereby reducing the reluctance of such air gap.

9. In an induction type relay the combination including a core member having aligned pole members, an energizing winding associated with said core member, an armature member disposed for rotation between the pole members of said core member, short-circuited turns associated with each of said pole members, additional short-circuited turns associated with small cross-sectional areas of each of said pole members, and means associated with each of said pole members for reducing the reluctance of the air gap between said small cross-sectional areas of said pole members by decreasing the length of such air gap.

ADOLF THEWALT.
ROBERT DEUSER.